(12) United States Patent
Witkowski

(10) Patent No.: US 11,512,781 B2
(45) Date of Patent: Nov. 29, 2022

(54) CLAPPER CHECK VALVE WITH A VALVE SEAT SEAL MEMBER

(71) Applicant: SPM Oil & Gas Inc., Fort Worth, TX (US)

(72) Inventor: Brian C. Witkowski, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 17/291,606

(22) PCT Filed: Nov. 5, 2019

(86) PCT No.: PCT/US2019/059945
§ 371 (c)(1),
(2) Date: May 6, 2021

(87) PCT Pub. No.: WO2020/197589
PCT Pub. Date: Oct. 1, 2020

(65) Prior Publication Data
US 2022/0018446 A1    Jan. 20, 2022

Related U.S. Application Data

(60) Provisional application No. 62/757,705, filed on Nov. 8, 2018.

(51) Int. Cl.
*F16K 15/03* (2006.01)
*F16K 1/20* (2006.01)
*F16K 1/42* (2006.01)

(52) U.S. Cl.
CPC .......... *F16K 1/2057* (2013.01); *F16K 1/2042* (2013.01); *F16K 1/42* (2013.01); *F16K 15/03* (2013.01)

(58) Field of Classification Search
CPC ...... F16K 1/2042; F16K 1/205; F16K 1/2057; F16K 15/03; F16K 15/031–038; Y10T 137/7898–7903
See application file for complete search history.

(56) References Cited

U.S. PATENT DOCUMENTS 2,900,029 A    8/1959   Harold
4,230,150 A *  10/1980  Scaramucci ............ F16K 15/03
                                                    137/527

(Continued)

OTHER PUBLICATIONS

"O-ring", Wikipedia, Apr. 9, 2013, https://en.wikipedia.org/wiki/O-ring#Material.

(Continued)

*Primary Examiner* — Kevin F Murphy
(74) *Attorney, Agent, or Firm* — Harrity & Harrity, LLP

(57) ABSTRACT

A valve assembly includes a valve body that defines an internal flow passageway between an inlet and an outlet, and a valve seat disposed in the valve body with a sealing surface perpendicular to the flow passageway. The valve assembly further includes a clapper pivotally correlated to the valve seat having a closed configuration extending across the valve seat configured to substantially close off the flow passageway, and an open configuration configured to substantially allow fluid flow in the flow passageway from the inlet to the outlet through the valve body. An annular valve seat seal is disposed within an annular groove formed in a surface of the valve seat, where the annular valve seat seal is disposed at an interface between the valve seat and the clapper when the clapper is in the closed configuration.

20 Claims, 6 Drawing Sheets

(56) References Cited

U.S. PATENT DOCUMENTS

| | | | |
|---|---|---|---|
| 4,252,144 A | 2/1981 | Scaramucci | |
| 4,258,925 A | 3/1981 | Guyton | |
| 4,508,139 A | 4/1985 | Teumer | |
| 4,782,855 A | 11/1988 | Scaramucci | |
| 5,205,532 A | 4/1993 | Naehring | |
| 2008/0308159 A1* | 12/2008 | Stunkard | F16K 27/0209 |
| | | | 137/315.33 |
| 2016/0084392 A1 | 3/2016 | Horton | |
| 2017/0234441 A1* | 8/2017 | Fuller | F16K 27/0227 |
| | | | 137/527 |
| 2018/0238459 A1* | 8/2018 | Nowell | F16K 15/03 |

OTHER PUBLICATIONS

International Search Report and Written Opinion received in Patent Cooperation Treaty Application No. PCT/US2019/059945 dated Apr. 28, 2020.

* cited by examiner

CLAPPER CHECK VALVE WITH A VALVE SEAT SEAL MEMBER

CROSS-REFERENCE TO RELATED APPLICATION

This application is a national phase application of Patent Cooperation Treaty Application No. PCT/US2019/059945 filed Nov. 5, 2019, which claims priority to U.S. Provisional Application No. 62/757,705 filed Nov. 8, 2018, which is incorporated herein by reference in their entirety.

FIELD

The present disclosure relates generally to valves, and in particular, to a clapper check valve with a valve seat seal member.

BACKGROUND

Hydraulic fracturing is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried. In these operations, clapper check valves are commonly used in fluid conduits to control the flow of fracking and/or gravel-packing fluids. A clapper style check valve (also called a clapper check valve or a clapper valve) permits fluid flow in one direction, but prevents, or at least reduces, fluid flow in a second direction, which is generally in the opposite direction. Any vibration caused by, for example, turbulence in the flow of fluid through the clapper valve, often produces significant wear to the internal components of the clapper valve. Moreover, the effectiveness of the clapper valve in preventing, or at least reducing, fluid flow in the second direction is often diminished as a result of improper alignment and/or excessive loading of the internal components of the clapper valve. Such issues typically cause premature deterioration of the clapper valve.

DETAILED DESCRIPTION

The clapper style check valve is a flow control device that permits flow in a conduit in one direction but stops or greatly reduces flow in the opposite direction. When used in well service applications, the clapper valve is placed in the treating line to allow flow to the well but isolates any back flow upstream. The use of the clapper valve at various locations in the flowline assures that pressure and fluids cannot back up into the manifold area or into the pumps. Because these valves are subject to harsh conditions, including high pressure, continuous-duty, and immersed in corrosive and high abrasive liquids, they can be short-lived and require frequent maintenance and servicing if improperly designed. It is desirable that these valves remain in service for a long life without leakage and other failures.

Figure 1:
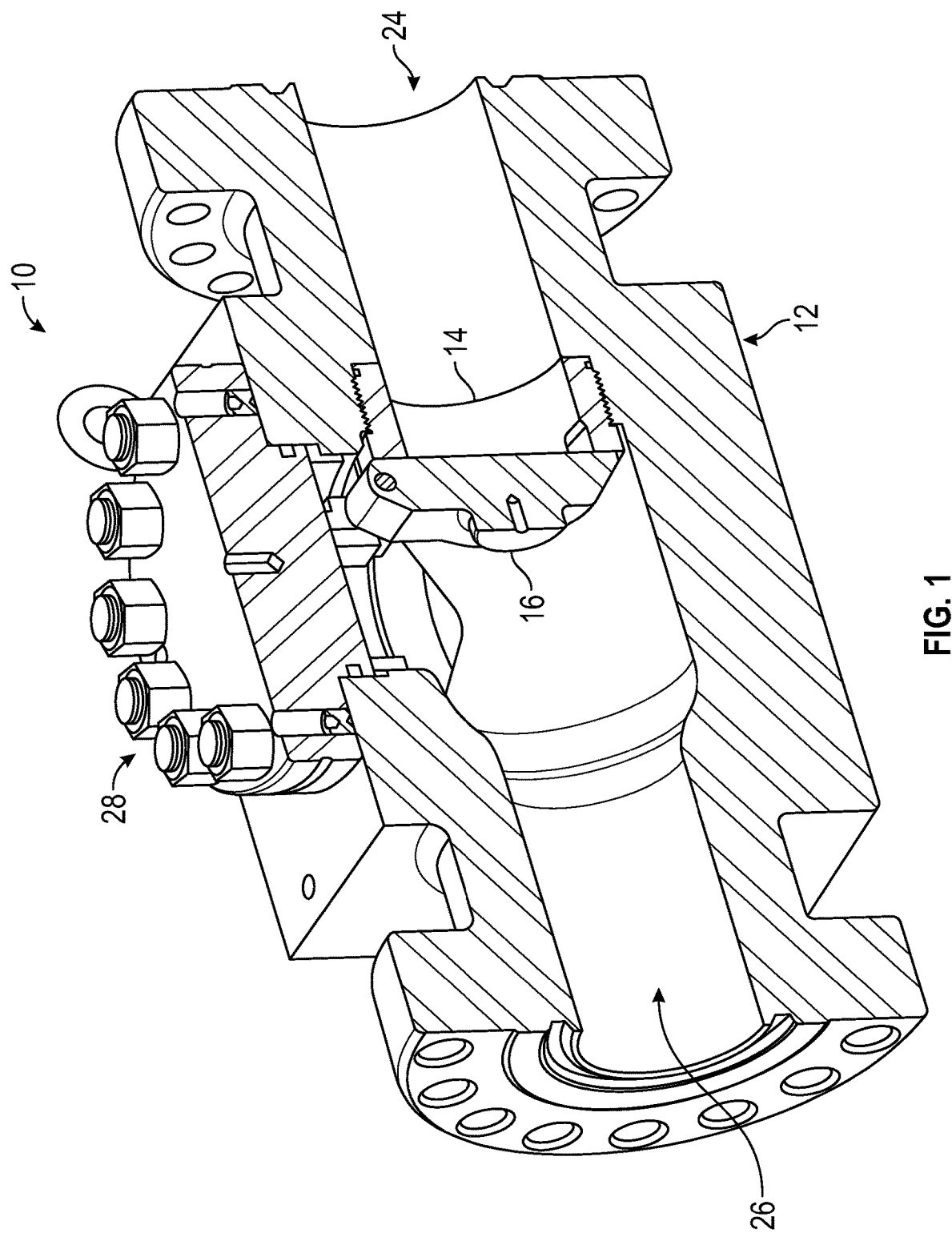
FIG. 1 is a perspective view of a clapper check valve according to the teachings of the present disclosure.
Figure 2:
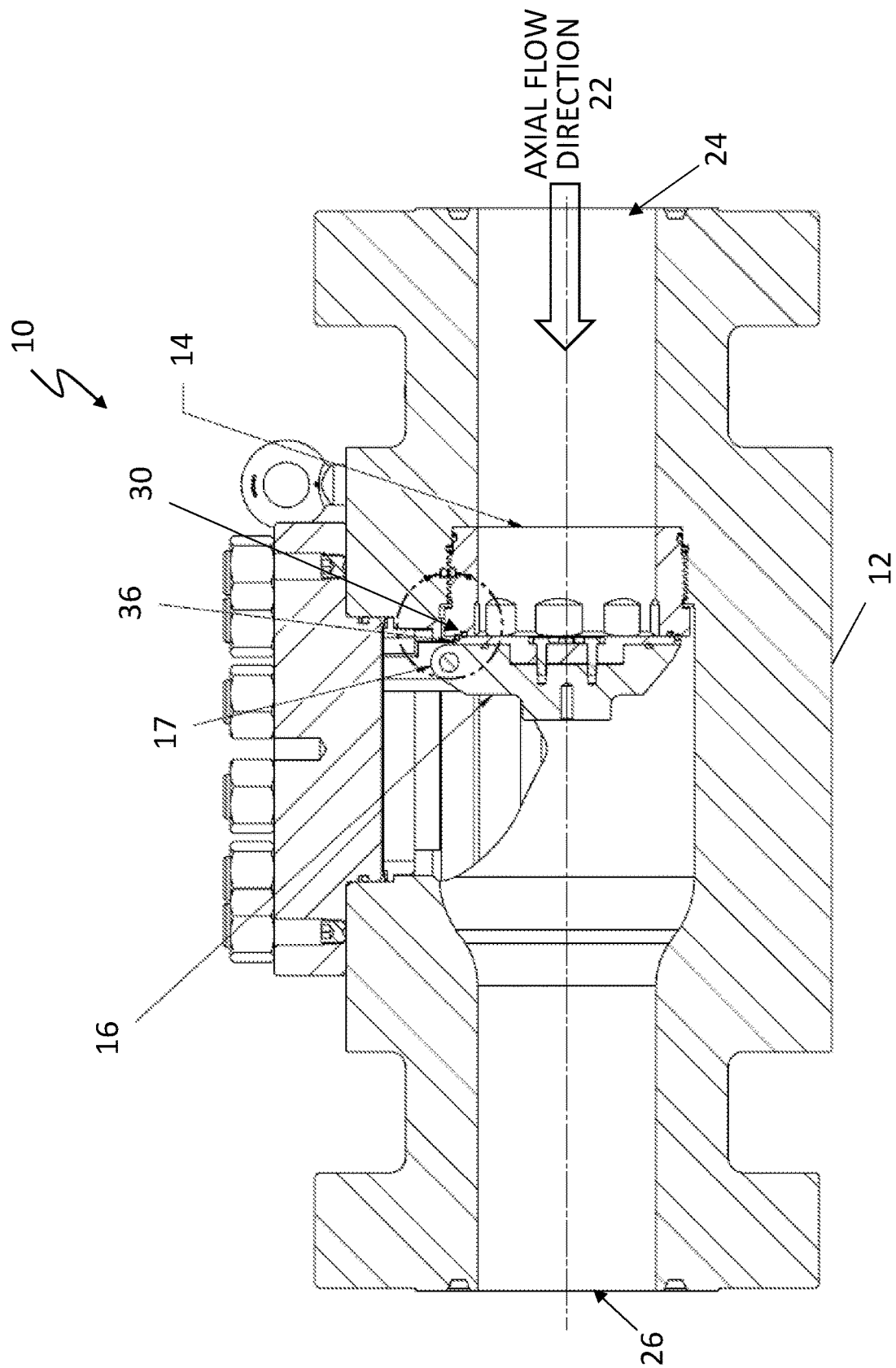
FIG. 2 is a cross-sectional view of an exemplary embodiment of a clapper check valve in a closed configuration according to the teachings of the present disclosure.
Figure 3B:
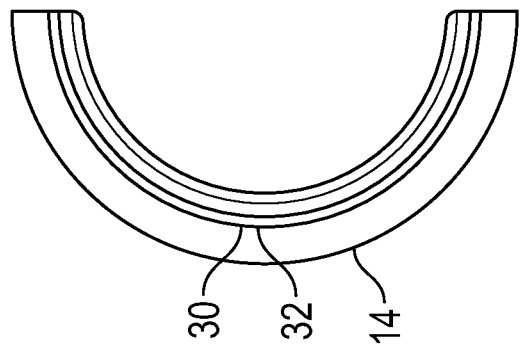
FIG. 3B is a partial detailed front view of an exemplary embodiment of a clapper valve seat according to the teachings of the present disclosure.
Figure 3A:
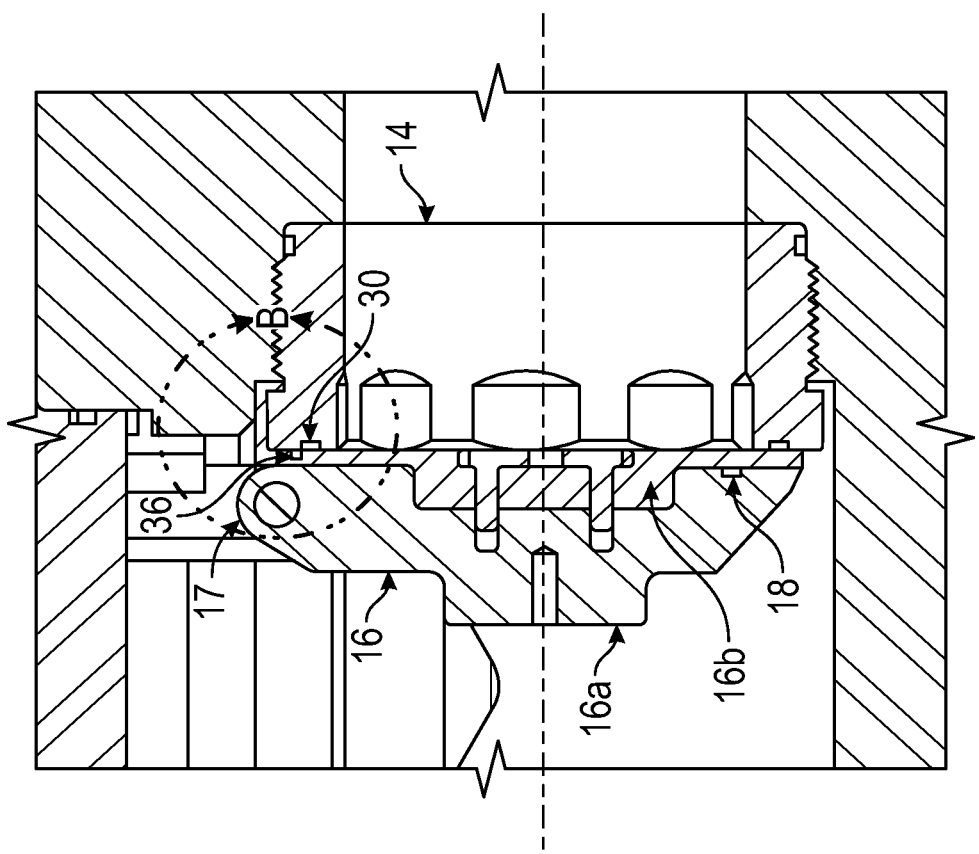
FIG. 3A is a partial detail cross-sectional view of an exemplary embodiment of a clapper check valve in a closed configuration shown in FIG. 2 according to the teachings of the present disclosure.
Figure 4:
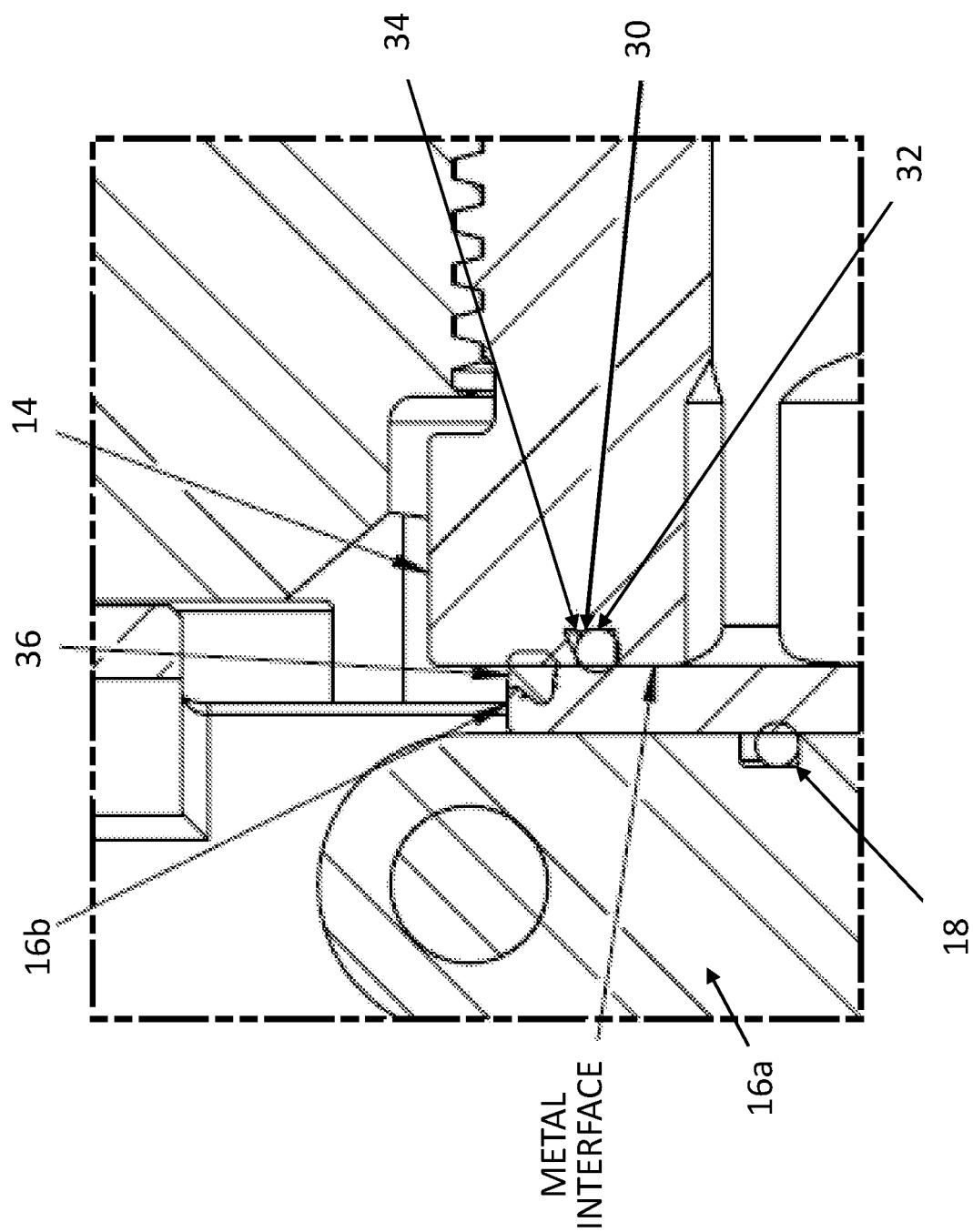
FIG. 4 is another more detailed partial cross-sectional view of an exemplary embodiment of a clapper check valve in a closed configuration shown in FIG. 2 according to the teachings of the present disclosure.
Figure 5:
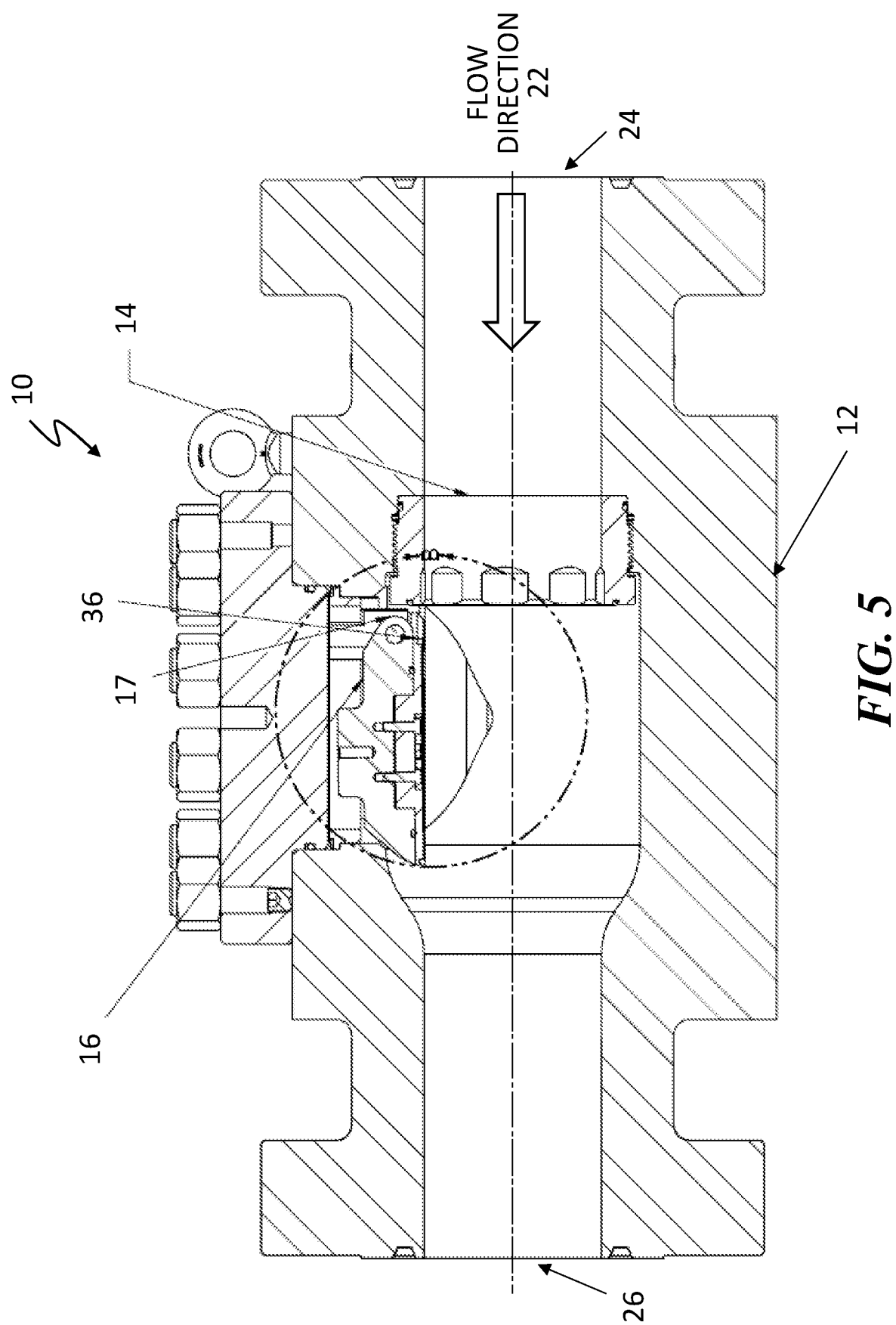
FIG. 5 is a cross-sectional view of an exemplary embodiment of a clapper check valve in an open configuration according to the teachings of the present disclosure.
Figure 6:
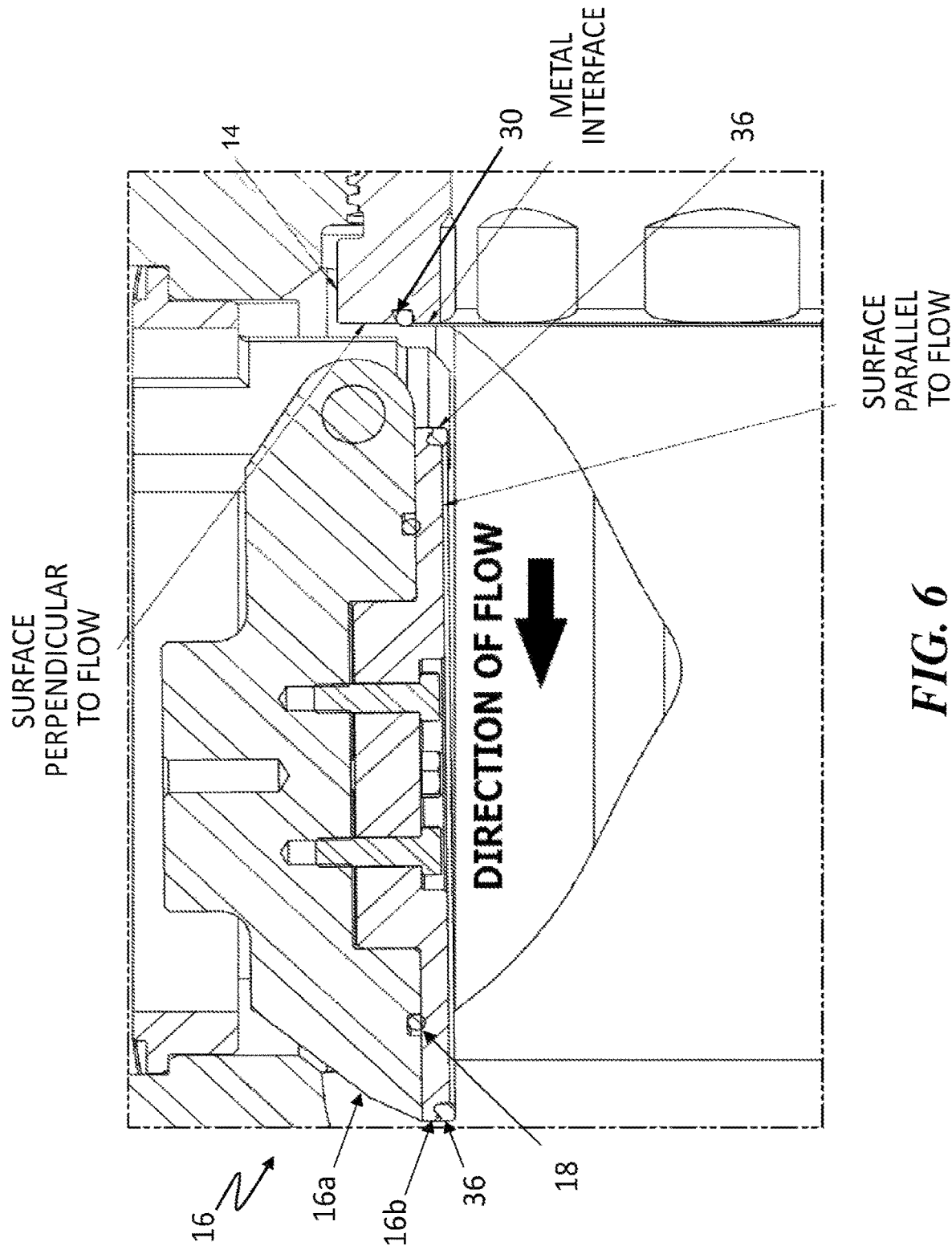
FIG. 6 is partial detail cross-sectional view of an exemplary embodiment of the clapper check valve in an open configuration shown in FIG. 5 according to the teachings of the present disclosure.

FIG. 1 is a perspective view of a clapper valve assembly 10 according to the teachings of the present disclosure, FIGS. 2-4 are cross-sectional views of the clapper valve 10 when it is in the closed configuration, and FIGS. 5 and 6 are cross-sectional views of the clapper valve 10 when it is in the open configuration. Of these views, FIGS. 3A, 3B, 4, and 6 are detailed partial views of the clapper valve 10 and valve seat 14 to show the sealing components of the valve assembly 10. Referring to FIGS. 2-6, the clapper valve 10 includes a valve body 12 defining an internal chamber, a valve seat 14 disposed within the internal chamber and connected to the valve body 12, and a clapper 16 pivotally coupled to a hanger 17 over the valve seat 14, and actuable between an open configuration, in which fluid flow is permitted through the valve body 12 (FIGS. 5 and 6), and a closed configuration, in which the clapper 16 is seated against the valve seat 14 to at least partially restrict fluid flow through a flow passageway defined in the valve body 12 (FIGS. 2-4). The clapper 16 is oriented substantially perpendicularly to the longitudinal axis of the flow passageway when it is in the closed configuration, and is oriented substantially parallel to the longitudinal axis of the flow passageway when it is in the open configuration. The components of the clapper valve 10 are preferably constructed of a suitable metal. The clapper valve 10 is adapted to be incorporated into a flowline through which fluid ordinarily flows in an axial direction 22 from its inlet 24 through the flow passageway to its outlet 26. The valve body 12 further defines a top access port 28 disposed above the clapper 16 and provides access to the clapper if needed for servicing and maintenance.

Referring to the detailed views in FIGS. 3A, 3B, and 4, the clapper valve 10 includes an annular seal 30 (such as an O-ring style seal) that is disposed in an annular groove 32 formed or machined on the face of valve seat 14. Preferably, the annular groove 32 includes a dovetail feature 34 (best shown in FIG. 4) which, when viewed in the cross-section, is a small triangular shaped extension. The dovetail groove 34 is a feature that has demonstrated excellent capability to capture and hold an O-ring style seal, such that it is capable of creating a high-pressure seal against an adjacent feature. The undercut dovetail profile creates sufficient interference with the O-ring seal to prevent it from being dislodged from the groove 32 during pumping operations. As shown in FIG. 6, it may be seen that this annular seal 30 is installed on a valve seat surface that is perpendicular to fluid flow through the valve body 12. Because this seal 30 is situated on the valve seat surface that faces away from fluid flow when the clapper 16 is open, it is significantly less exposed to flow dynamic forces and subject to a reduction in stresses and wearing on the seal.

As shown in FIG. 3A, the clapper 16 may include two components 16a and 16b coupled together. Component 16a forms the base of the clapper and pivotally secures the clapper 16 in the fluid passageway, and component 16b defines the surface area that contacts the valve seat 14 when the clapper 16 is in its closed configuration. An annular seal 18 is disposed at an interface between components 16a and 16b of the clapper. Best seen in FIG. 4, the clapper valve 10 further includes an annular bonded seal 36 that is affixed to the clapper 16 at or near the outer edges of the component 16b. The seal 36 is formed and contoured for bonding to a sealing edge of the clapper 16 and contacts the valve seat 14. In contrast to annular seal 30, this seal 36 is bonded to a corner edge surface of the clapper 16 that is generally parallel to the fluid flow through the valve body 12 when the clapper 16 is in its open configuration. At this location, this seal 36 is more exposed to fluid flow dynamics and more subject to stresses and wear. When the clapper is in the closed configuration, seals 30 and 36 form concentric and substantially adjacent seals at the interface of the clapper 16 and valve seat 14.

A clapper valve 10 may include a sealing configuration that includes one or both seals 30 and 36 to ensure proper sealing in the flowline. The valve assembly may further employ the annular seal 30 with other sealing arrangements. The seals 30, 36, and 18 may be fabricated from one or more materials such as, for example, a deformable thermoplastic material, a polyurethane material, a fiber-reinforced material, carbon, glass, cotton, wire fibers, cloth, and/or any combination thereof.

The novel valve configuration described herein can be employed for any valve and seal present in any flowline in the frac operation. An exemplary hydraulic fracturing site employs positive displacement pumps, a slurry blender, fracturing fluid tanks, high-pressure flow iron (pipe or conduit), trailers upon which some equipment are carried, valves, wellhead, charge pump (typically a centrifugal pump), conveyers, and other equipment at the site of a hydraulic fracturing operation or other types of hydrocarbon recovery operations. Various flowlines may be used to convey fracking fluids between the equipment and to and from the wellhead.

The features of the present invention which are believed to be novel are set forth below with particularity in the appended claims. However, modifications, variations, and changes to the exemplary embodiments described above will be apparent to those skilled in the art, and the novel clapper valve configuration described herein thus encompasses such modifications, variations, and changes and are not limited to the specific embodiments described herein.

What is claimed is:

1. A valve assembly comprising:
   a valve body defining an internal flow passageway between an inlet and an outlet;
   a valve seat disposed in the valve body and including a sealing surface that is perpendicular to a longitudinal axis of the internal flow passageway;
   a clapper pivotally correlated to the valve seat between a closed configuration and an open configuration, wherein
   when the clapper is in the closed configuration, the clapper extends across the valve seat and is configured to substantially close off the internal flow passageway, and
   when the clapper is in the open configuration, the clapper is configured to substantially allow fluid flow in the internal flow passageway from the inlet to the outlet through the valve body;
   an annular valve seat seal disposed within an annular groove formed in the sealing surface of the valve seat, the annular valve seat seal being disposed at an interface between the valve seat and the clapper when the clapper is in the closed configuration; and
   an annular clapper seal disposed at an interface between a first clapper component of the clapper and a second clapper component of the clapper, the annular clapper seal being spaced apart from the annular valve seat seal when the clapper is in the closed configuration.

2. The valve assembly of claim 1, wherein the annular valve seat seal comprises a circular cross-section and the annular groove comprises a circular cross-section with a dovetail groove extension.

3. The valve assembly of claim 1, wherein the annular clapper seal is a first annular clapper seal; and
   wherein the valve assembly further comprises a second annular clapper seal bonded to the clapper and being disposed at an interface between the valve seat and the clapper when the clapper is in the closed configuration.

4. The valve assembly of claim 1, wherein the annular clapper seal is a first annular clapper seal; and
   wherein the valve assembly further comprises a second annular clapper seal bonded to a corner edge of the clapper and being disposed at an interface between the valve seat and the clapper substantially concentric and proximate to the annular valve seat seal when the clapper is in the closed configuration.

5. The valve assembly of claim 1, wherein the annular valve seat seal includes at least one material selected from the group consisting of a deformable thermoplastic material, a polyurethane material, a fiber-reinforced material, carbon, glass, cotton, wire fibers, and cloth.

6. The valve assembly of claim 1, wherein the annular clapper seal includes at least one material selected from the group consisting of a deformable thermoplastic material, a polyurethane material, a fiber-reinforced material, carbon, glass, cotton, wire fibers, and cloth.

7. The valve assembly of claim 1,
   wherein the first clapper component forms a base of the clapper and pivotally secures the clapper to the valve seat; and
   wherein the second clapper component is coupled to the first clapper component and forms a surface area that contacts the valve seat when the clapper is in the closed configuration.

8. The valve assembly of claim 1, wherein the sealing surface of the valve seat faces away from the inlet of the valve body.

9. A clapper valve assembly comprising:
   a valve body defining an internal flow passageway between an inlet and an outlet;
   a valve seat disposed in the valve body and including a sealing surface faces toward the outlet and away from the inlet;
   a clapper pivotally correlated to the valve seat between a closed configuration and an open configuration, wherein when the clapper is in the closed configuration, the clapper extends across the valve seat and is configured to substantially close off the internal flow passageway, and when the clapper is in the open configuration, the clapper is configured to substantially allow fluid flow in the internal flow passageway from the inlet to the outlet through the valve body;

an annular valve seat seal disposed within an annular groove formed in the sealing surface of the valve seat, the annular valve seat seal being disposed at an interface between the clapper and the valve seat when the clapper is in the closed configuration; and an annular clapper seal disposed at an interface between a first clapper component of the clapper and a second clapper component of the clapper, the annular clapper seal being spaced apart from the annular valve seat seal when the clapper is in the closed configuration.

10. The clapper valve assembly of claim 9, wherein the annular groove comprises a circular cross-section with a dovetail groove extension.

11. The clapper valve assembly of claim 9, wherein the annular clapper seal is a first annular clapper seal; and wherein the clapper valve assembly further comprises a second annular clapper seal bonded to a surface of the clapper, wherein when the clapper is in the open configuration, the surface of the clapper is parallel to a longitudinal axis of the internal flow passageway, and when the clapper is in the closed configuration, the second annular clapper seal is disposed at an interface between the clapper and the valve seat.

12. The clapper valve assembly of claim 9, wherein the annular valve seat seal includes at least one material selected from the group consisting of a deformable thermoplastic material, a polyurethane material, a fiber-reinforced material, carbon, glass, cotton, wire fibers, and cloth.

13. The clapper valve assembly of claim 9, wherein the annular clapper seal includes at least one material selected from the group consisting of a deformable thermoplastic material, a polyurethane material, a fiber-reinforced material, carbon, glass, cotton, wire fibers, and cloth.

14. The clapper valve assembly of claim 9, wherein the first clapper component forms a base of the clapper and pivotally secures the clapper to the valve seat; and wherein the second clapper component is coupled to the first clapper component and forms a surface area that contacts the valve seat when the clapper is in the closed configuration.

15. The clapper valve assembly of claim 9, wherein the sealing surface of the valve seat is substantially perpendicular to a longitudinal axis of the internal flow passageway.

16. A valve assembly comprising:

a valve body defining an internal region in fluid communication with an inlet and an outlet;

a valve seat disposed in the valve body;

an annular groove defined in the valve seat in a surface facing toward the outlet and away from the inlet;

an annular valve seat seal disposed within the annular groove;

a clapper pivotally actuable between a closed configuration and an open configuration, wherein when the clapper is in the closed configuration, the annular valve seat seal is sealingly engaged with the clapper to restrict fluid flow through the internal region, and when the clapper is in the open configuration, fluid flow is permitted through the internal region; and an annular clapper seal bonded to a corner edge of the clapper and being disposed at an interface between the valve seat and the clapper when the clapper is in the closed configuration, wherein, when the clapper is in the closed configuration, the annular clapper seal is spaced apart from each of the annular valve seat seal and an outer edge of the surface of the valve seat.

17. The valve assembly of claim 16, wherein the annular groove comprises a circular cross-section with a triangular-shaped dovetail groove extension.

18. The valve assembly of claim 16, wherein the annular clapper seal is a first annular clapper seal; and wherein the valve assembly further comprises a second annular clapper seal disposed at an interface between a first clapper component of the clapper and a second clapper component of the clapper, the second annular clapper seal being spaced apart from the annular valve seat seal when the clapper is in the closed configuration.

19. The valve assembly of claim 18, wherein the first clapper component forms a base of the clapper and pivotally secures the clapper to the valve seat; and wherein the second clapper component is coupled to the first clapper component and forms a surface area that contacts the valve seat when the clapper is in the closed configuration.

20. The valve assembly of claim 16, wherein at least one of the annular valve seat seal or the annular clapper seal comprises at least one of a deformable thermoplastic material, a polyurethane material, a fiber-reinforced material, carbon, glass, cotton, wire fibers, or cloth.

* * * * *